United States Patent
Lin

(10) Patent No.: US 10,023,004 B2
(45) Date of Patent: Jul. 17, 2018

(54) DEFORMABLE TIRE

(71) Applicant: Po-Kang Lin, Taipei (TW)

(72) Inventor: Po-Kang Lin, Taipei (TW)

(*) Notice: Subject to any disclaimer, the term of this patent is extended or adjusted under 35 U.S.C. 154(b) by 123 days.

(21) Appl. No.: 15/215,606

(22) Filed: Jul. 21, 2016

(65) Prior Publication Data

US 2018/0022148 A1    Jan. 25, 2018

(51) Int. Cl.
*B60B 1/06* (2006.01)
*B60B 1/00* (2006.01)

(52) U.S. Cl.
CPC .............. *B60B 1/06* (2013.01); *B60B 1/003* (2013.01); *B60B 1/006* (2013.01)

(58) Field of Classification Search
CPC ........... B60B 1/06; B60B 1/006; B60B 1/003; A61G 5/06; A61G 5/061; B62D 57/02
USPC ............... 152/5, 6, 7, 8, 11, 12, 17, 18, 20; 280/5.2, 5.22, 5.26
See application file for complete search history.

(56) References Cited

U.S. PATENT DOCUMENTS

| | | | | |
|---|---|---|---|---|
| 1,808,660 A * | 6/1931 | Johnson | ................. | B25B 13/44 81/113 |
| 2,916,331 A * | 12/1959 | Gardner | ................. | B60B 19/04 305/19 |
| 3,179,431 A * | 4/1965 | Pikl | ........................ | A61G 5/061 152/13 |
| 3,226,129 A * | 12/1965 | McKinley | .............. | A61G 5/061 152/5 |
| 8,011,736 B2 * | 9/2011 | Tan | ........................... | B60B 1/06 301/31 |
| 9,445,960 B2 * | 9/2016 | Abughaida | ............ | A61G 5/061 |
| 2014/0034198 A1 * | 2/2014 | Wichern | ................ | B62K 25/04 152/18 |

FOREIGN PATENT DOCUMENTS

DE            10324740 A1 * 12/2004   .............. B60B 9/26

* cited by examiner

*Primary Examiner* — Samuel J Morano, IV
*Assistant Examiner* — Jean W Charleston
(74) *Attorney, Agent, or Firm* — Lin & Associates Intellectual Property, Inc.

(57) ABSTRACT

The present invention provides a deformable tire including a plurality of spokes. A first end of each of the spokes is connected to a core structure, and a second end of each of the spokes is connected to a tire body. A first length is provided between each of the tire bodies and the core structure connected by each of the spokes, and the spokes are elastic. The core structure is configured to fix and support the plurality of spokes, and each of the first lengths is dynamically adjusted by the elasticity of the spokes.

6 Claims, 6 Drawing Sheets

DEFORMABLE TIRE

BACKGROUND OF THE INVENTION

1. Field of the Invention

The present invention relates to a tire, more particularly, relates to a tire with elastic spokes.

2. The Prior Art

A tire is a round object that can rotate around an axis thereof so as to decrease friction during movement. Once a tire is equipped with an axel, it is transformed into a primary component of various kinds of vehicles. Tires are one of the most important inventions in human history and are rather useful in the field of transportation. A conventional tire usually consists of a tire frame with spokes and a rubber tire body.

In a conventional tire structure, a rubber tire body usually has a circular shape so as to be wrapped around a tire frame. Generally, a tire frame is formed with multiple spokes that are fixed on a core structure. Vehicles that are equipped with such conventional tires are meant to travel on flat surfaces. When it comes to grounds with height differences such as a staircase, such conventional tires becomes ineffective. Since conventional tires are not designed for climbing, the vehicles equipped with such tires may experience inconvenience when travelling on ground with height differences. For example, small vehicles such as bicycles and wheelchairs equipped with conventional tires are likely to experience such inconvenience. In particular, wheelchair users, who are usually incapable of walking, may experience great trouble if the wheelchair is not competent of climbing.

Based on the above reasons, there is an urgent need in the industry to develop a deformable tire based on elastic spokes, so vehicles equipped with such deformable tires are enabled to climb surfaces with height differences.

SUMMARY OF THE INVENTION

In view of the foregoing drawbacks, a primary objective of the present invention is to provide a deformable tire including a plurality of spokes. A first end of each of the spokes is connected to a core structure, and a second end of each of the spokes is connected to a tire body. A first length is provided between each of the tire bodies and the core structure connected by each of the spokes, and the spokes are elastic. The core structure is configured to fix and support the plurality of spokes, and each of the first lengths is dynamically adjusted by the elasticity of the spokes.

Preferably, each of the first lengths is dynamically adjusted to a second length via the elasticity of each of the spokes. The second length is smaller than the first length.

Preferably, the tire bodies are fixed on the core structure via the spokes. The tire bodies are arranged in two lines, which are parallel to and staggered with each other, around the core structure.

Preferably, each of the tire bodies in the two lines of the tire bodies are not in connection with each other, and the two lines of the tire bodies are arranged so the tire bodies are not overlapped with each other.

Preferably, each of the tire bodies in the two lines of the tire bodies are not in connection with each other, and the two lines of the tire bodies are arranged so the tire bodies are partially overlapped with each other.

Preferably, a plurality of holes is provided on the core structures for receiving the spokes. Each of the first lengths is adjusted by each of the spokes via the holes, or, each of the first lengths is adjusted by the elasticity of each of the spokes.

Preferably, each of the first lengths is adjusted to a third length by each of the spokes via the holes on the core structure, and the third length is smaller than the first length.

Preferably, each of the spokes is one of a damper and an elastic structure.

Preferably, the deformable tire is applicable for one of a bicycle and a wheel chair.

Other purposes, advantages and innovative features of the present invention will become apparent by reading the following detailed description together with the accompanying drawings.

BRIEF DESCRIPTION OF THE DRAWINGS

The present invention is best understood from the following detailed description when read in connection with the accompanying drawings. In order to achieve the foregoing objectives of the present invention, preferable embodiments of the present invention are illustrated in the drawings. It should be understood that the present invention should not be limited by the exact configuration, structure and apparatus illustrated in the drawings.

DETAILED DESCRIPTION OF THE PREFERRED EMBODIMENT

The present invention will be described in details with reference to the accompanying drawings in the following section. It should be noted that the drawings are not necessarily drawn to scale for the purpose of simplicity.

Figure 1:
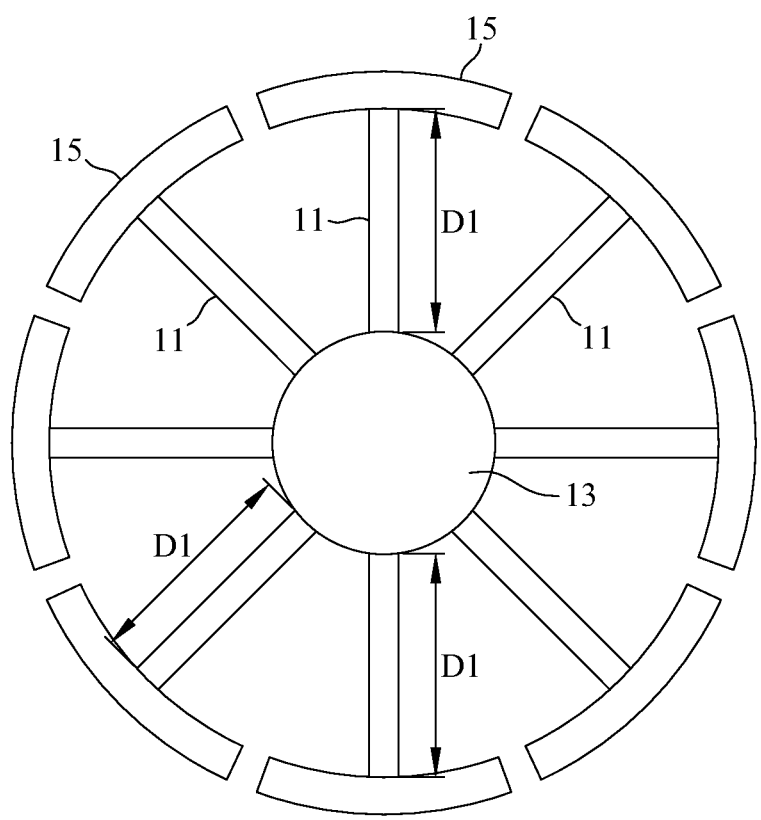
FIG. 1 is a schematic view illustrating the structure of a deformable tire according to a first embodiment of the present invention.

FIG. 1 is a schematic view illustrating the structure of a deformable tire according to a first embodiment of the present invention. As shown in FIG. 1, according to the first embodiment of the present invention, the deformable tire 1 includes a plurality of spokes 11. A first end of each of the spokes 11 is connected to a core structure 13. A second end of each of the spokes 11 is connected to a tire body 15. A first length D1 is provided between each of the tire bodies 15 and the core structure 13. Herein, the spokes 11 are elastic. The core structure 13 is configured to fix and support the spokes 11, and each of the first lengths D1 is dynamically adjusted by the elasticity of the spokes 11. It should be understood that the structure of the tire body 15 is substantially similar to the tire bodies available on the market. The difference between the two lies in that each of the tire bodies 15 connected by the spokes 11 of the present invention are not in connection with each other and may be adjusted according to the type of the vehicle. For example, the tire bodies 15 may be adjusted and changed into bicycle tires or wheelchair tires. In addition, in the first embodiment of the present invention, the spokes 11 may be configured as shock absorbers; however, in other embodiments of the present invention, the spokes 11 may be configured as other elastic structures. Furthermore, the number of the spokes 11 shown in the figures is merely for the purpose of illustration and may be adjusted according to the needs of the user or the vehicle.

Figure 2A:
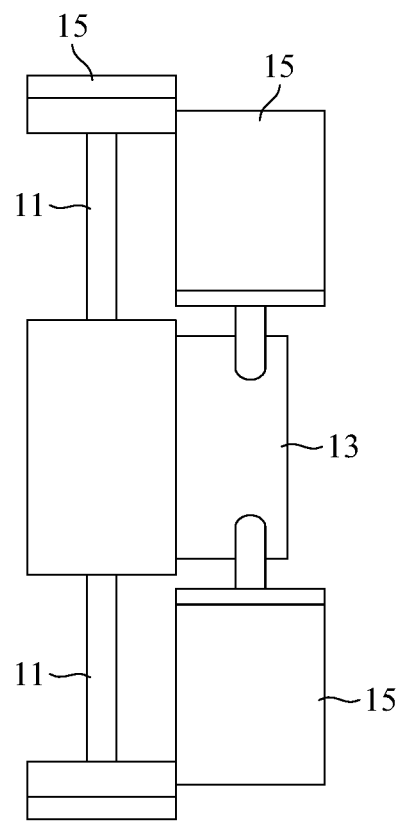
FIG. 2a is a schematic view illustrating an arrangement of the tire bodies of the deformable tires according to the first embodiment of the present invention.
Figure 2B:
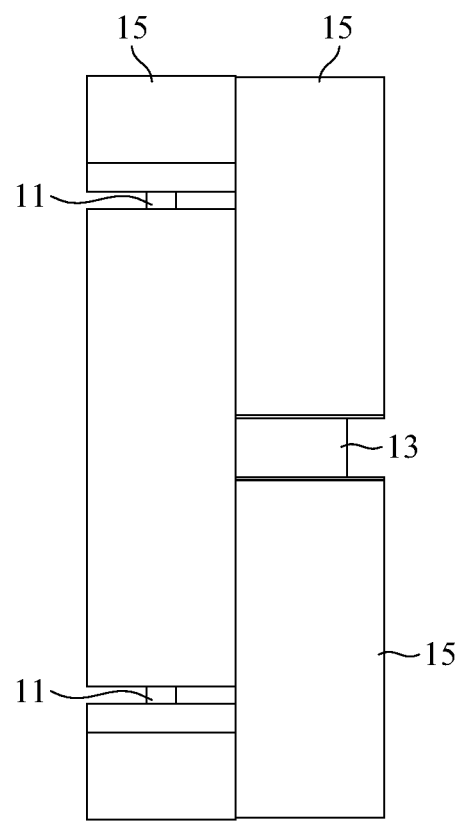
FIG. 2b is a schematic view illustrating an arrangement of the tire bodies of the deformable tires according to another embodiment of the present invention.

FIG. 2*a* is a schematic view illustrating an arrangement of the tire bodies of the deformable tires according to the first embodiment of the present invention. As shown in FIG. 2*a*, which is a side view of the deformable tire 1 according to the first embodiment of the present invention, it can be seen that the tire bodies 15 are fixed on the core structure 13 via the spokes 11. The tire bodies 15 are arranged in two lines, which are parallel to and staggered with each other, around the core structure 13. Herein, each of the tire bodies 15 in the two lines of the tire bodies 15 are not in connection with each other, and the two lines of the tire bodies 15 are arranged so the tire bodies 15 are not overlapped with each other. By arranging the tires bodies 15 in two staggering lines that are not overlapped with each other, the deformable tire 1 may have a high climbing efficiency. FIG. 2*b* is a schematic view illustrating an arrangement of the tire bodies of the deformable tires according to another embodiment of the present invention. As shown in FIG. 2*b*, which is a side view illustrating the deformable tire 1 according to another embodiment of the present invention, it can be seen that the tire bodies 15 are fixed on the core structure 13 via the spokes 11. The tire bodies 15 are arranged in two lines, which are parallel to and staggered with each other, around the core structure 13. Herein, each of the tire bodies 15 in the two lines of the tire bodies 15 are not in connection with each other, and the two lines of the tire bodies 15 are arranged so the tire bodies 15 are overlapped with each other. By arranging the tires bodies 15 in two staggering lines that are overlapped with each other, the deformable tire 1 may have a higher stability. The tires bodies with overlapping arrangement and non-overlapping arrangement each has its own merits, and thus may be applied to various vehicles that are suitable for various types of ground surfaces.

Figure 3:
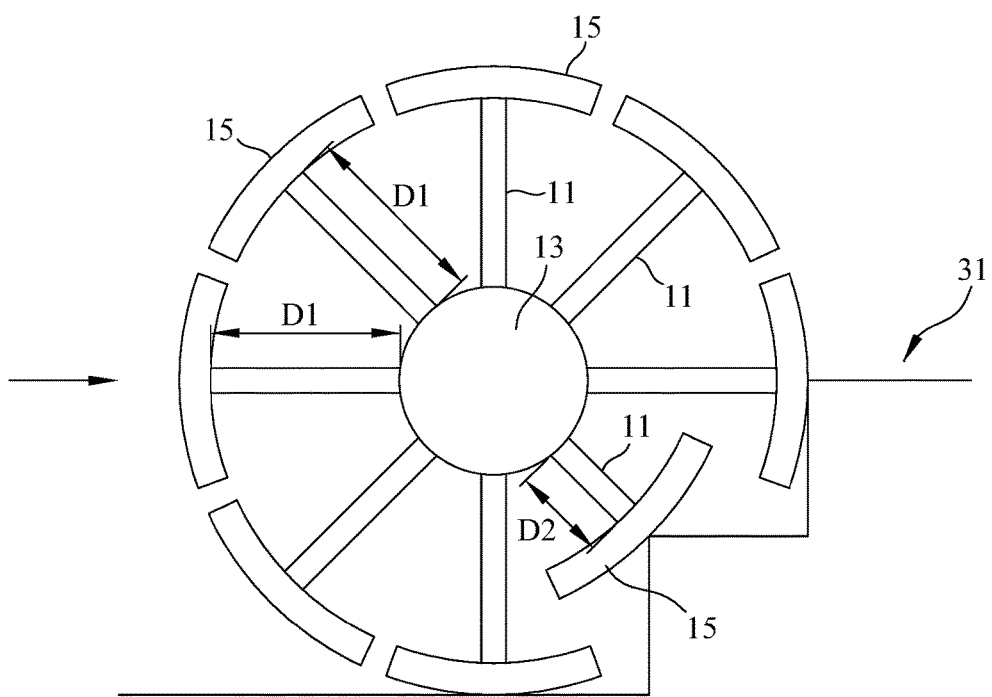
FIG. 3 is a schematic view illustrating the operation of the deformable tire according to the first embodiment of the present invention.

FIG. 3 is a schematic view illustrating the operation of the deformable tire according to the first embodiment of the present invention. As shown in FIG. 3, when the deformable tire 1 of the first embodiment of the present invention is near and about to climb a staircase 31, one of the spokes 11 will come into contact with the staircase 31 via the tire body 15 connected thereto. Due to the elasticity, the spoke 11 in contact with the staircase 31 is dynamically adjusted to a second length D2 that is smaller than the first length D1. After one of the spokes 11 is compressed to the second length D2, it will stretch back to the first length D1 again by pushing against the staircase 31 via the elasticity thereof. In such a way, the deformable tire 1 may achieve climbing with the elasticity of the spokes 11.

Figure 4:
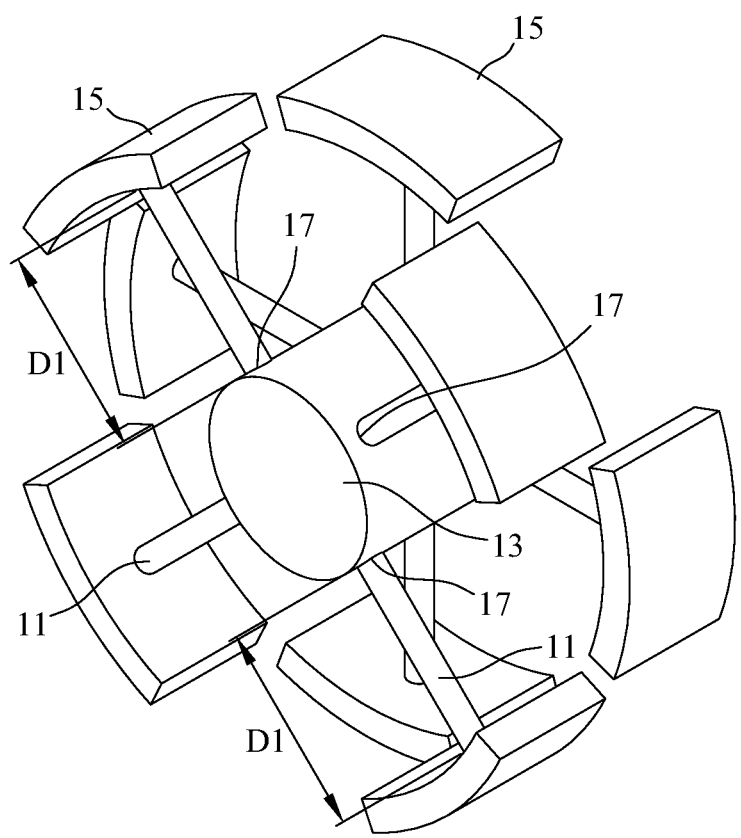
FIG. 4 is a schematic view illustrating the structure of a deformable tire according to a second embodiment of the present invention.

FIG. 4 is a schematic view illustrating the structure of a deformable tire according to a second embodiment of the present invention. Referring to FIG. 4, the deformable tire 2 includes a plurality of spokes 11. A first end of each of the spokes 11 is connected to a core structure 13. A second end of each of the spokes 11 is connected to a tire body 15. A first length D1 is provided between each of the tire bodies 15 and the core structure 13. Herein, the spokes 11 are elastic. The core structure 13 is configured to fix and support the spokes 11, and each of the first lengths D1 is dynamically adjusted by the elasticity of the spokes 11. In addition, a plurality of holes 17 is provided on the core structure 13. Each of the holes 17 is provided with a depth for receiving a spoke 11. Each of the first lengths D1 is adjusted by each of the spokes 11 via the holes 17, or, each of the first lengths D1 is adjusted by the elasticity of each of the spokes 11. It should be understood that the structure of the tire body 15 is substantially similar to the tire bodies available on the market. The difference between the two lies in that each of the tire bodies 15 connected by the spokes 11 of the present invention are not in connection with each other and may be adjusted according to the type of the vehicle. For example, the tire bodies 15 may be adjusted and changed into bicycle tires or wheelchair tires. In addition, in the second embodiment of the present invention, the spokes 11 may be configured as shock absorbers; however, in other embodiments of the present invention, the spokes 11 may be configured as other elastic structures. Based on the above description, it can be known that the structure of the deformable tire 2 of the second embodiment of the present invention is substantially similar to the structure of the deformable tier 1 of the first embodiment of the present invention. Hence, the operation of the deformable tire 2 is also the same as the deformable tire 1 in the first embodiment. The only difference between the two embodiments lies in that the core structure 13 of the deformable tire 2 includes multiple holes 17 for receiving the spokes 11. Furthermore, the number of the spokes 11 shown in the figures is merely for illustration and may be adjusted according to the needs of the user or the vehicle.

Figure 5:
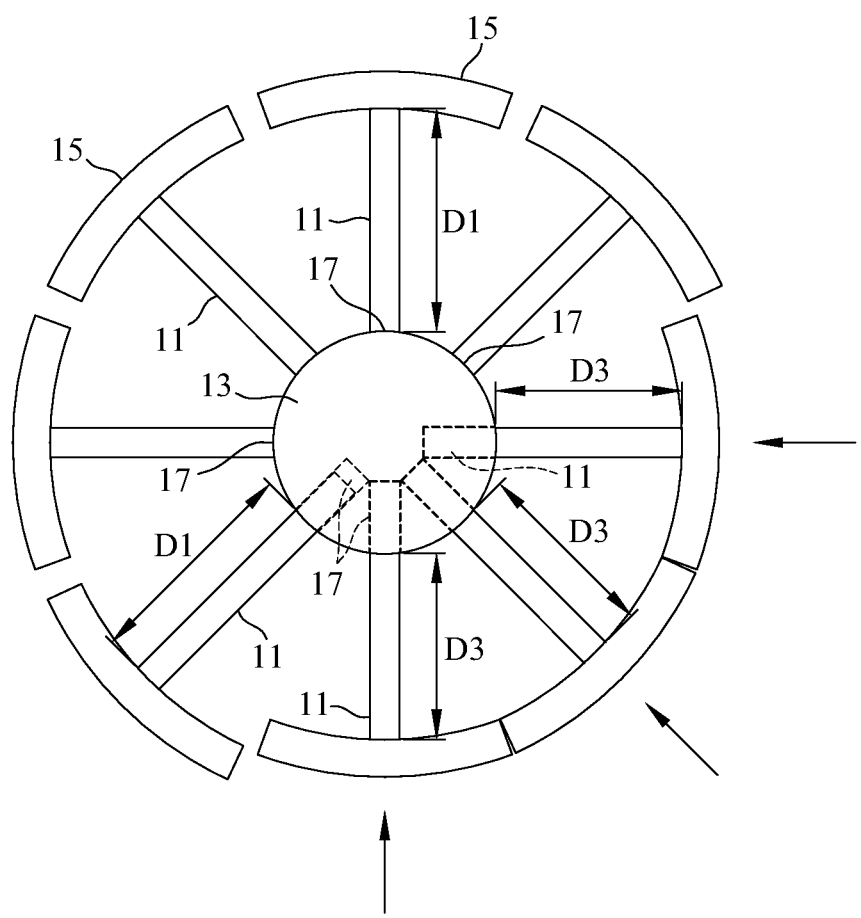
FIG. 5 is a schematic view illustrating the accommodation of the deformable tire according to the second embodiment of the present invention.

FIG. 5 is a schematic view illustrating the accommodation of the deformable tire according to the second embodiment of the present invention. Referring to FIG. 5, the deformable tire 2 according to the second embodiment of the present invention is configured to accommodate via the holes 17. More particularly, the spokes 11 may move toward the core structure 13 via the holes 17 so as to adjust the first length D1 to a third length D3. Herein, the third length D3 is smaller than the first length D1. In an accommodated state, the spokes 11 are configured to penetrate into the core structure 13 through the holes 17. As a result, the overall size of the deformable tire 2 may be reduced, and the deformable tire 2 may be accommodated and carried more easily. It can be known from FIGS. 2*a* and 2*b* that the spokes 11 and the tire bodies are arranged on the core structure 13 in two parallel lines that are staggered with each other. Therefore, the spokes 11 are refrained from interfering with each other and also refrained from further affecting the accommodation process when being retracted toward the center of the core structure 13. Moreover, the depths provided by the holes 17 for receiving the spokes 11 may be adjusted accordingly based on the needs of the users. In some other embodiments of the present invention, each of the spokes 11 may even wholly enter the holes 17 provided on the core structure 13 so as to minimize the size of the deformable tire 2.

It can be known from the above description that a deformable tire, which is capable of climbing and is easy to be accommodated, is provided by the present invention. The deformable tire of the present invention is applicable to various types of vehicles, in particular, is applicable to bicycles and wheelchairs. A bicycle equipped with the deformable tire of the present invention may be able to freely climb various types of stairs; in addition, because the spokes may be retracted toward the core structure, the bicycle equipped with such deformable tires may gain the advantages of having a small overall size while also being easy to accommodate and being easy to carry. On the other hand, a wheelchair with the deformable tire of the present invention on its both sides may also be able to climb various types of stairs, so people with disabilities are enabled to climb stairs as well.

Although the operation of the method according to the embodiments of the present invention has been described in a certain order, it is not meant to limit the order of the steps. It should be apparent to those skilled in the art that the method can also be performed in a different order. Therefore, the order of the steps should not be seen as a limitation to the claims of the present invention. In addition, the method in the claims should not be limited by the order of steps described above. Those who are skilled in the art should understand that the order of the steps can be changed without departing from the scope of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A deformable tire, comprising:
   a plurality of spokes, wherein a first end of each of the spokes is connected to a core structure, and a second end of each of the spokes is connected to a tire body, wherein a first length is provided between each of the tire bodies and the core structure connected by each of the spokes, and the spokes are elastic;
   wherein the core structure is configured to fix and support the plurality of spokes, each of the first lengths is dynamically adjusted by an elasticity of the spokes, the tire bodies are fixed on the core structure via the spokes, the tire bodies are arranged in two lines, which are parallel to and staggered with each other, around the core structure; and
   wherein each of the tire bodies in the two lines of the tire bodies are not in connection with each other, and the two lines of the tire bodies are arranged in such a way that the tire bodies are not overlapped with each other.

2. The deformable tire according to claim 1, wherein each of the first lengths is dynamically adjusted to a second length via the elasticity of each of the spokes, and the second length is smaller than the first length.

3. The deformable tire according to claim 1, wherein a plurality of holes is provided on the core structures for receiving the spokes, each of the first lengths is adjusted by each of the spokes via the holes, or, each of the first lengths is adjusted by the elasticity of each of the spokes.

4. The deformable tire according to claim 3, wherein each of the first lengths is adjusted to a third length by each of the spokes via the holes on the core structure, and the third length is smaller than the first length.

5. The deformable tire according to claim 1, wherein each of the spokes is one of a damper and an elastic structure.

6. The deformable tire according to claim 1, wherein the deformable tire is applicable for one of a bicycle and a wheelchair.

\* \* \* \* \*